United States Patent
Hirai

(10) Patent No.: US 6,967,777 B2
(45) Date of Patent: Nov. 22, 2005

(54) SUPERPOSING DIFFRACTION OPTICAL ELEMENT HOMOGENIZER OPTICAL SYSTEM

(75) Inventor: Takayuki Hirai, Osaka (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 11/002,883

(22) Filed: Dec. 3, 2004

(65) Prior Publication Data
US 2005/0200958 A1   Sep. 15, 2005

(30) Foreign Application Priority Data
Mar. 10, 2004   (JP) .............................. 2004-066616

(51) Int. Cl.[7] .......................... G02B 27/44; G02B 27/46
(52) U.S. Cl. ...................... 359/563; 359/566; 359/569; 219/121.61
(58) Field of Search ................................ 359/558–576; 219/121.61, 121.76, 121.65, 121.7; 355/67

(56) References Cited
U.S. PATENT DOCUMENTS
2002/0080491 A1 * 6/2002 Goto .......................... 359/566

FOREIGN PATENT DOCUMENTS
JP   2003-270585   * 9/2003

* cited by examiner

Primary Examiner—Leonidas Boutsikaris
(74) Attorney, Agent, or Firm—McDermott Will & Emery LLP

(57) ABSTRACT

A DOE homogenizer including a plurality of parallel lasers emitting Gaussian beams of a diameter d along beam lines extending in a z-direction and aligning at a pitch p in an x-direction, and off-axis DOEs diffracting the Gaussian laser beams at inclining diffraction angles, making quasi-uniform density q×w (q>w) stripe-sectioned beams on an image plane I (xy-plane) which is distanced by a focal length f from the DOEs and aligning at the pitch p on an x-direction extending base line K vertical to the beam lines in an order of larger inclining diffraction angles outward and smaller inclining diffraction angles inward on extensions of the beam lines of the lasers, the DOEs diffracting the laser Gaussian beams into the quasi-uniform density stripe-sectioned beams, superposing the diffracted beams partially at edges and making a unified x-direction extending quasi-uniform beam on the image plane I.

8 Claims, 9 Drawing Sheets first homogenizer second homogenizer third homogenizer (a) two off-axis DOEs and one on-axis DOE    (b) three on-axis DOEs (a) two off-axis DOEs and one on-axis DOE (b) three on-axis DOEs

SUPERPOSING DIFFRACTION OPTICAL ELEMENT HOMOGENIZER OPTICAL SYSTEM

BACKGROUND OF THE INVENTION

Field of the Invention

This invention relates to an optical system for making a uniform intensity beam with a striped, rectangular section (Q×w: Q>>w). High power laser beams are utilized for welding, cutting, boring, annealing or other heat processing of objects. Necessary wavelengths of lasers depend upon the objects and the kind of the processing. $CO_2$ laser beams of wavelengths of 9 μm to 11 μm are suitable for welding and annealing metal. YAG laser beams of a 1.06 μm wavelength is effective for piercing and annealing. A 532 nm wavelength of the second harmonic generation YAG (SHG-YAG) laser is promising for annealing of amorphous silicon (a—Si). When heat power of laser beams is used, non-uniform intensity beams are sometimes available. However, other heat processing sometimes requires uniform power density of irradiation laser beams.

This application claims the priority of Japanese Patent Application No. 2004-66616 filed on Mar. 10, 2004, which is incorporated herein by reference.

Some processing requires an in-phase beam which means that wave components of light have a common phase on a plane vertical to a beam axis. A beam which has the parallelism property and the in-phase property can propagate afterward without loosing the uniformity of power density. Such an in-phase parallel uniform power density beam is an ideal beam. It is, however, difficult to produce such an in-phase, parallel, uniform beam. Thus, some heat processing adheres only to the uniform power density at a certain plane for reducing the difficulty of endowing a beam with parallelism, in-phase property and uniformity. The plane on which the components have a common phase is called an image plane. If the temporarily uniform beam propagates further over the image plane, the uniformity is disturbed. But an object can be irradiated with the temporarily uniform beam with uniform power density by positioning the object just on the image plane. The present invention tries to propose an optical system for making such a temporal uniform power density beam which has uniform power only on a definite image plane.

A beam emitted from a laser is a cylindrical, parallel beam. Power density of the laser beam is not uniform. The laser beam has been produced in a resonator cavity formed between two spherical concave lenses with large curvature radii. The laser beam has higher power density at the center and lower power density at the periphery. The power distribution of laser beams is ideally a Gaussian distribution. When an object is directly irradiated with an inherent laser beam, the power distribution of the irradiation beam on the object is Gaussian. Some objects and some processings deny Gaussian beams but require uniform power beams. Preparation of uniform power beams requires an optical system for converting a Gaussian laser beam into a uniform power distribution beam. The uniform distribution beam is sometimes called a "tophat" beam, since the power distribution is constant within a definite area and falls to zero outside of the range. The optical system for converting the Gaussian beam into the uniform power density beam is called a "homogenizer".

There are two methods for converting the Gaussian beam into the uniform power beam. One method is a lens type one relying upon a set of aspherical lenses. The other is a diffraction type one making use of a set of diffraction optical elements (DOEs).

A lens type homogenizer is first described. A typical lens homogenizer consists of two lenses for refracting a cylindrical Gaussian laser beam into a tophat beam. One lens is an intensity-conversion lens which makes uniform distribution of power by enlarging central parts of the Gaussian beam and shrinking peripheral parts of the Gaussian. No ordinary spherical lens has such contradictory functions of partial enlargement and partial reduction. An aspherical lens should be assigned to be the intensity-conversion lens. An input laser beam is converted into a uniform power beam but phases of wave components are disturbed. The output beam is an out-of-phase tophat beam. Here, "out-of-phase" means a state in which wave components have different phases on any planes vertical to an axis. The intensity-conversion lens makes a tophat beam at a sacrifice of in-phase property.

The other lens, which is called a "phase-compensation lens", equalizes phases of beams. Namely, the phase-compensation lens revives an in-phase state in which all wave components have a common phase on any plane vertical to the beam axis. A pair of the intensity-conversion lens and the phase-compensation lens is called a "lens homogenizer". The laser power equalization by the pair of aspherical lenses has advantages of low loss, in-phase property and parallelism. The pair of the intensity-conversion lens and the phase-compensation lens is called a "lens homogenizer".

In addition to the lens homogenizer, there is another type of homogenizer based upon diffraction optical elements (DOEs). The DOE homogenizer makes a uniform or quasi-uniform power density beam by diffraction instead of refraction. FIG. 1 shows an example of the DOE homogenizer which converts a round Gaussian laser beam into a round uniform or quasi-uniform power density beam. A laser (not shown) emits a round Gaussian beam 2. The Gaussian power distribution is shown below on a left side. The Gaussian laser beam 2 goes into a DOE 3. The DOE 3 is a transparent plate having plenty of microelements (pixels) of different height (thickness) steps aligning lengthwise and crosswise. The DOE 3 has a function of diffracting light. A reducing beam 4 diffracted by the DOE 3, which is a non-parallel beam, becomes a tophat beam (uniform density beam) 6 just on an image plane 5. The tophat power distribution of the diffracted beam 6 is shown below on a right side in FIG. 1.

In many cases, sections of the uniform-power diffracted beams 6 formed on the image plane 5 are circles. However, uniform power beams with elliptical sections can be also made on the image plane. A square sectioned (q×q) uniform (tophat) diffraction beam can be also made on the image plane by a DOE. A rectangle sectioned (q×w) uniform (tophat) diffraction beam can be also made on the image plane by another DOE. The word "tophat" means that the beam has uniform power distribution within a definite, restricted region but does not mean that the beam has a circular section.

A wavelength of a laser beam is denoted by "λ". A DOE has many pixels with a plurality of steps of thickness. A total difference ΔD between the thickest part and the thinnest part of the DOE should coincide with a single wavelength λ. Namely, the total step difference ΔD is given by an equation λ=(n−1)ΔD. A unit of steps is determined to be a quotient of ΔD divided by $2^k$ (k: integer). For example, for k=8 and $2^k$=256, a step unit is ΔD/256. Step heights of pixels are determined to be multiples of the step unit.

In the example shown in FIG. 1, the diameter of the round uniform density beam on the image plane is smaller than a diameter of an input laser beam. For instance, the diameter of the input laser beam is 2 mm (p and a diameter of an output uniform beam on the image is 1 mmφ. The beam diameter is reduced. Why such a shrinking optics is employed is that the power density of the laser beam is still weak. And required uniform power density for heat-processings should be far strong. The power density should be raised for compensating for imbalance by shrinking the beam diameter of the beam. The DOE produces the uniform power density (tophat) beam 6 on the image plane 5 by diffracting peripheral laser rays inward stronger and central laser rays inward weaker. Although the diffracted beam is uniform just on the image plane, the beam becomes non-uniform at other spots before or after the image plane.

FIG. 1 is only a schematic view of the DOE. The DOE makes use of not refraction light but diffraction light. A variety of noise accompanies the DOE. The DOE utilizes only the first order diffraction light. Second order, third order or other higher order diffraction light or 0-th order light are yielded by the DOE. The higher order components and the 0-th order component are not simply converged as shown in FIG. 1. Thus, the higher order and 0-th order components are noise. This is a weak point of DOEs. However, the noise is negligibly weak in ordinary cases of DOEs. Further drawback is the difficulty of processing caused by a variety of step heights of microelements (pixels). The degree of freedom is large for DOEs. But, the high degree of freedom increases the difficulty of processing and finishing. The high degree of freedom is a drawback of DOEs. Since DOEs are designed for making uniform power density only on an image plane, the uniformity of power density is rapidly degraded at spots deviating forward or backward from the image plane.

The degree of freedom of design is high. The high degree of freedom prevents a designer from determining a single preferable DOE system for making a uniform power distribution beam. There are many probable DOE system candidates capable of preparing a uniform power beam. If a designer selects one among the probable DOE candidates, the chosen one is not always the best one. Unlike the lens type homogenizers, the DOE type homogenizers are plagued by many inherent disadvantages.

The above-described lens type homogenizer (intensity-conversion lens & phase-compensation lens) can make a parallel, in-phase tophat beam. It is no matter for the lens type homogenizer whether the image plane deviates forward or backward from a determined position due to the parallelism and the in-phase property. Furthermore, the lens type homogenizer, which makes use of only refraction, is immune from problems of diffraction, e.g., higher order diffraction and 0-th order diffraction. The lens type homogenizer can produce a neat tophat beam on an image plane. The paired lens homogenizer is an excellent one. Since a lens has inherently a rotation symmetry, the lens homogenizer is quite suitable for producing a cylindrical, circular-sectioned uniform power beam. On the contrary, the lens homogenizer is incompetent to make a cylindrically-asymmetric, e.g., rectangular-, square- or ellipse-sectioned beam.

Laser heat treatments do not always require rotationally-symmetric cylindrical uniform power beams. The desired sections of beams depend upon the kind of heat treatments and the shape of objects. Sometimes a square section q×q of a uniform power density beam is required. Sometimes a rectangle section q×w of a uniform power beam is required. Otherwise, a stripe section q×w (w<<q) may be required for a uniform power density beam. Lens homogenizers are incompetent for the purpose of preparing non-circle beams.

The before-described diffraction optical elements (DOEs) are suitable for the purpose of making uniform power density non-circular (rectangular, striped) sectioned beams. A DOE is an optical device having plenty of tiny units (pixels) aligning crosswise and lengthwise in two dimensions, having different thicknesses (heights), and diffracting light into light with an arbitrary direction, shape and density distribution. A DOE has extremely high degree of freedom which is a product of the pixel number and the height step number. The high degree of freedom enables a DOE to make a q×q square sectioned uniform beam or a q×w rectangle sectioned uniform beam. DOE homogenizers are competent for such a purpose of making square, rectangular sectioned beams.

A long stripe-sectioned (Q×w; Q>>w) uniform density beam as a limit of high Q/w rate rectangles is sometimes required. For example, in the case of producing large liquid crystal display panels, such a long stripe uniform power laser beam is requested. The liquid crystal display panel has plenty of thin film transistors made by evaporating amorphous silicon (a—Si) films on a glass substrate and processing the amorphous silicon films to transistor devices. For some purposes, amorphous silicon transistors are available. But, electron mobility on amorphous silicon is not high enough yet for producing liquid crystal display panels of high quality.

The electron mobility can be enhanced by heating the amorphous silicon (a—Si), enlarging crystalline granules, and converting the amorphous silicon into polycrystalline silicon (poly-Si). But, it is undesirable to heat the amorphous silicon film on the glass substrate. If the amorphous silicon is heated by a heater, the glass substrate is also heated together. For example, it is preferable to heat the amorphous silicon at temperatures between 800° C. and 1000° C. for converting a—Si to poly-Si. Ordinary glass substrates have weak resistance against heat. If the glass substrate is heated up at 800° C., the glass substrate is softened and melted out. Direct heating is unsuitable. What is necessary is a special means which can heat only the amorphous silicon without heating the substrate glass. Neither resistor heaters nor induction heaters are competent. They need much time for heating the a—Si film. In the meantime, heat is conducted to heat-fragile grass substrates. A single candidate may be rapid heating by momentary light irradiation. If light carried a great amount of heat only to the amorphous silicon film without heating the substrate, the light heating would perhaps succeed in converting a—Si into poly-Si without melting the under-substrate.

Momentary irradiation of large power lasers should be a favorable candidate. In the case, the laser light should have a short wavelength which amorphous silicon effectively absorbs. Infrared light and red-yellow visible light are not fully absorbed by amorphous silicon. Ultraviolet rays are desirable, since amorphous silicon can absorb the ultraviolet rays at high efficiency. Excimer lasers, for example, KrF lasers or ArF lasers, can produce high power ultraviolet rays, which satisfy the condition imposed on wavelengths and power. But, the ultraviolet rays made by the KrF lasers or ArF lasers are still plagued by disorder of wavefronts and irregular, non-Gaussian power distribution. The KrF or ArF lasers are disqualified. A YAG laser emits a large power 1.06 μm Gaussian beam. But, 1.06 μm is infrared light which passes through amorphous silicon without loss. The YAG laser is incompetent. An SHG-YAG laser produces a 532 nm light beam. Amorphous silicon can absorb 532 nm. Thus, SHG-YAG lasers are effective candidates for a light source of the high power heating treatment. The SHG-YAG lasers on sale are still annoyed with shortage of power. However, large power SHG-YAG lasers will be made in near future.

In the case of liquid crystal display panels, a small diameter round tophat beam is unuseful, since an object is to momentarily heat a wide a—Si film piled upon a wide grass substrate. Scanning a wide glass with a spot beam many times lengthwise and crosswise would take too long time, which would reduce throughput. A long stripe-sectioned uniform power beam is far favorable than the spot tophat beam. What is desired is a strong, uniform power beam with a section of stripe (Q×w; Q>>w). Q is a length and w is a depth. The beam should be scanned in a direction parallel with the thickness (depth) w. The size of an object is denoted by K×H, where K is a length and H is a depth. The object can be fully scanned by K/Q times and H length of scanning of the Q long stripe uniform beam. A longer length Q of the scanning beam reduces scanning times of K/Q.

Otherwise, there are some utilities of requiring a strong, stripe-sectioned uniform density beam in addition to the conversion form a—Si to poly-Si on liquid crystal display panels. In these cases, an ideal beam would be a parallel, in-phase (coherent), uniform, stripe-section beam. However, satisfying parallelism, in-phase property, uniformity and stripe section is very difficult. Thus, we give up parallelism and in-phase property. What is essential is uniformity and stripe section just on a definite image plane. The present invention relates to a DOE homogenizer for preparing a strong, uniform power density, zone-section beam for light heating treatment.

DESCRIPTION OF RELATED ART

Japanese Patent Publication No. 2003-270585, "Laser illumination optical system, and exposure device, laser beam machining device and laser projection device using the same", proposes an apparatus of employing laser diode array having a plurality of equivalent laser diodes aligning in series at a pitch p as a light source, placing the same number of holograms on extension of the laser diodes with the same pitch p, converting laser beams by the holograms into p×w rectangle uniform beams, lining up the rectangle beams on an image plane without margins without overlap. If two rectangle tophat beams were overlapped at edges, power density would be doubled at the spot. Interference would be induced by the overlapping. Thus overlapping was denied. If a gap were left between two rectangle beams, power density would be 0 at the gap. Thus a gap was denied.

The prior art document tried to have produced a pN long uniform zone-sectioned beam by aligning N parallel lasers and N parallel holograms at a vertical pitch p, converting laser beams into p×w rectangle beams, and aligning the rectangle beams on an image plane without overlapping and gap. Equivalent lasers and equivalent holograms were available.

A hologram is a device produced by irradiating a photosensitive medium with interfering object light and reference light from different angles, making interfering fringes in the medium, and recording the interfering fringes in the medium. The hologram is made by piling a photosensitive medium, e.g., photograph films on a side or sides of a substrate, irradiating the photosensitive medium with object light and reference light simultaneously. Japanese Patent Publication No. 2003-270585 makes a recording element by making a diverging beam by a laser, dividing the diverging beam by a beam splitter, converting one divided beam into a parallel uniform power rectangle-sectioned beam by some means, irradiating a photosensitive medium on both sides by the diverging beam and the rectangle-sectioned beam, and developing the photomedium.

SUMMARY OF THE INVENTION

A purpose of the present invention is to provide an apparatus for shaping Gaussian laser beams into a long stripe sectioned quasi-uniform power distribution beam. Here, a stripe means a rectangle having a large horizontal/vertical ratio. It may be theoretically possible to make a quasi-uniform striped sectioned beam from a single Gaussian beam by a single DOE as shown in FIG. 2. In FIG. 2, a DOE 3 has a function of enlarging an input beam 2 into a diverging, stripe-sectioned beam 4 which makes a stripe quasi-uniform (tophat) image 6 on an image plane 5. The section of the beam on the plane 5 is denoted by Q×W, wherein Q (length) is far larger than w (width) (Q>>w).

The stripe-sectioned beam having a long Q as shown in FIG. 2 would not be suitable for the above-mentioned purpose of heat-treatment of wide objects.

Another candidate may be a device making use of a plurality of lasers which arrange plural lasers in parallel and holograms in parallel for converting the laser Gaussian beams into uniform power beams as proposed by the previously cited document of Japanese Patent Publication No. 2003-270585.

The prior art document proposed a hologram device for making a uniform power beam by producing a plurality of Gaussian beams by parallel-arranged lasers at a pitch p, converting the Gaussian beams into uniform beams of a section of a rectangle (p×q: p>q), where the length is equal to the laser pitch p, by holograms laid in front of the lasers, joining the rectangle beams without overlapping on a plane and obtaining a pN long stripe uniform beam. Use of a plurality of lasers enhances the total power of light.

A laser diode array having tiny aligning laser diodes is a light source in Japanese Patent Publication No. 2003-270585. Laser diode arrays are small. The pitch of lasers in the array is very short, e.g., a 400 μm to 500 μm pitch. A 5 laser array, a 10 laser array or a 20 laser array can be easily fabricated at low cost. The length L=mp can be extended by increasing the number of lasers in an array.

But some drawbacks accompany the use of semiconductor laser diode arrays. Wavelengths of light produced by semiconductor lasers are not always suitable for objective light-treatments. The power of semiconductor lasers is too weak yet at present. An array of semiconductor lasers is still insufficient. Most light-treatments require high power light. Semiconductor laser arrays are incompetent in many cases.

Large solid-state lasers or big gas lasers should be employed for obtaining high power light. Solid-state lasers and gas lasers have a large length, broad width, big height and heavy weight. It is impossible to align the solid-state lasers or gas lasers at a pitch of 500 μm like semiconductor laser diodes. The solid/gas lasers have wide discharging tubes. If a plurality of solid/gas lasers are aligned in parallel, the vertical pitch between the lasers will be 10 mm, 20 mm or more. Even if the lasers having extremely thin discharge tubes are used, the vertical pitch between the lasers is longer than 4 mm.

One purpose of the present invention is to provide an optical system for producing a long stripe-sectioned, uniform power density beam from such wide gas lasers or large solid-state lasers as light sources. The before-cited Japanese Patent Publication No. 2003-270585 had a drawback of difficulty of adjusting joints between neighboring tophat beams without gap and overlapping.

Another purpose of the present invention is to provide an optical system which has a wide tolerance for margins of the joints between the neighboring beams for facilitating to join the neighboring beams.

A further purpose of the present invention is to provide an optical system which has a high degree of freedom of designing of positions, sizes and locations of lasers, DOEs and objects.

Another purpose of the present invention is to provide an optical system immune from the 0-th order noise and higher order noise.

This invention can be applied to both a shrinking optical system and an enlarging optical system.

An (shrinking) optical system of the present invention prepares a long stripe-sectioned, quasi-uniform power density beam by aligning a plurality of parallel lasers for producing Gaussian beams of a diameter d, aligning the same number of off-axis type DOEs in an order of increasing diffraction angles $\Theta$ outward, diffracting the d-$\phi$ Gaussian laser beams by the DOEs into quasi-uniform power rectangle (q×w; w<q<d) sectioned beams at an image plane, superposing the quasi-uniform stripe sectioned beams partially overlapped at edges, and forming a long quasi-uniform striped sectioned beam on the image plane.

An essential part of the system is off-axis DOEs. A system can be built only by off-axis DOEs. But another system can include an on-axis type DOE. A mixture system should dispose an on-axis DOE at the center, position off-axis DOEs at off-axis spots on both sides in the order of increasing diffraction angles $\Theta$ outward for guiding diffraction beams to converge toward a center on the image plane. Neighboring reduced rectangle-sectioned diffraction patterns are partially superposed at peripheries on the image plane for making a unified continual uniform power density stripe beam on the plane.

The above optical system aims at shrinking the incidence beam in size for producing a diffracted beam having stronger uniform power density. But this invention can also make another optical system aiming at enlarging the incidence beam in size for producing a diffracted beam having weaker uniform power density. The present invention can give an enlarging optical system as follows.

An (enlarging) optical system of the present invention prepares a long stripe-sectioned, quasi-uniform power density beam by aligning a plurality of parallel lasers for producing d-$\phi$ Gaussian beams, aligning the same number of off-axis type DOEs in an order of increasing diffraction angles $\Theta$ outward, diffracting the d-$\Theta$ Gaussian laser beams by the DOEs into quasi-uniform power rectangle (q×w; w<q, d<q) sectioned beams at an image plane, superposing the quasi-uniform stripe sectioned beams partially overlapped at edges, and forming a long quasi-uniform striped sectioned beam on the image plane.

In both the shrinking and enlarging optical systems, the fact that the DOEs are an off-axis type is important in the present invention. The off-axis DOEs can eliminate 0-th order noise which passes straight through a DOE. This is a great advantage of off-axis DOEs. Unlike a lens, the 0-th order noise accompanies on-axis type DOEs. The present invention can remove the 0-th order noise by the use of off-axis DOEs. Furthermore, off-axis DOEs can eliminate minus order (−1 st, −2 nd, −3 rd . . . orders) diffraction beams. Fortunately, off-axis DOEs can also remove plus higher order (+2 nd, +3 rd, +4 th . . . ) diffraction, since the plus higher order beams are diverted from the object. The off-axis optics has an advantage of eliminating 0-th order, plus higher order and minus order diffraction beams from the image plane.

Another important matter is that the sum of the neighboring diffracted beams is constant in the vicinity of joints by partially superposing mild sloping functions. Since two neighboring beams should be superposed with continuity, the two should not be tophats.

Mild steep hills are suitable for superposition. There may be several functions which give quasi-uniform density to diffracted beams and enable the diffracted beams to be superposed with continuity at joints. One candidate of quasi-uniform functions is low order supergaussian functions. A supergaussian is a function taking a form of exp$(-2(2x/q')^m)$. Here "m" is a positive integer which is called a supergaussian order parameter. A Gaussian is obtained by taking m=2. For a smaller order parameter m, supergaussians resemble the Gaussian. At the limit of infinite large numbers of m, supergaussians become a tophat function (rectangle function or step function) which takes 1 in the region $-q'/2 \leq x \leq q'/2$ and 0 in the regions $x<-q'/2$ and $q'/2<x$. Namely, the supergaussian can represent a beam having a rectangle section of a length q'. q'/2 means a half of the length.

Neighboring beams are overlapped at joints by superposing partially the neighboring tails for making a smooth flat plateau. Individual diffraction beams should take not a tophat shape but a mild sloped hill shape. The present invention takes supergaussians of low order parameters m=3 to 20 as a quasi-uniform function in the longitudinal direction (x-direction) and another supergaussians of lower order parameters n=2 to 10 in the depth direction (y-direction). Since the beam is scanned in the y-direction, the uniformity in the y-direction is not necessary. An off-axis diffracted beam is represented by a supergaussian, $$\exp(-2(2(x-g)/q')^{m-2} - 2(2y/w)n): m=3 \text{ to } 20, n=2 \text{ to } 10, g: \text{off-axis value (offset)}.$$

The off-axis value (offset) g is an x-coordinate of the center of a diffracted beam on the image plane. The offset g takes discrete values. In the case of a symmetric system having an even number N of lasers and DOEs (N=2h: h: integer), the offset g takes N=2h different values of $g=\pm q/2$, $\pm 3q/2$, $\pm 5q/2$, ..., $\pm(h-\frac{1}{2})q$, where q is the width of a diffracted beam in the x-direction.

In the case of a symmetric system having an odd number N of lasers and DOEs (N=2h+1: h: integer), the offset g takes N=2h+1 different values of g=0, $\pm q$, $\pm 2q$, $\pm 3q$, ..., $\pm hq$, where g=0 means a 0-offset of an on-axis DOE. Even in the case of the odd number of laser/DOEs, an asymmetric system can be built with only off-axis DOEs.

Here q' is the length of the diffracted stripe-sectioned beam and q is the pitch of the superposition of the diffracted beams. The relation between q' and q is described. The beam length q' is nearly equal to the beam pitch q. But strictly speaking, the beam length q' and the pitch q are not exactly equal for the supergaussian functions. The supergaussian distributing function defines edges of the beam at the spots at which the power density falls to $e^{-2}$ of the maximum power density. At the spot, x=q', which corresponds to the edge of a supergaussian beam. If an edge of a first supergaussian would be joined to another edge of a second supergaussian, the sum of the supergaussian at the edges would be $2e^{-2}=0.27$, which is smaller than 1. The margin of superposition should be increased for giving 1 to the joint. An extra margin should be a half of the difference q' and q. In practice, two supergaussians should be superposed for maintaining the sum=1 for the overlapping edge. The beam pitch q is not equal to but slightly shorter than the beam length q' (q'>q) for supergaussian quasi-uniform distribution functions. However, in this description, q and q' are sometimes identified as the diffracted beam length without rigorous distinction, since q is still nearly equal to q'.

Use of another type of quasi-uniform distribution functions enables the DOE diffraction to equalize the beam size q' to the beam pitch q (q=q'). For example, a product of Fermi's functions is a candidate of a quasi-uniform function for assuring q=q'. An x-direction quasi-uniform function based upon Fermi's functions is given by, $$[\exp[-\beta\{x-g+(q/2)\}]+1]^{-1}[\exp[\beta\{x-g-(q/2)\}]+1]^{-1}$$
$$(\beta=20/q \text{ to } 5/q, g: \text{offset})$$

The above x-relating function takes about 1 for $-q/2<(x-g)<q/2$ and takes 0 for $(x-g)<-q/2$ or $q/2<(x-g)$. And a y-direction quasi-uniform function is written by, $$[\exp[-\gamma\{y+(w/2)\}]+1]^{-1}[\exp[\gamma\{y-(w/2)\}]+1]^{-1}$$
$$(\gamma=20/w \text{ to } 5/w).$$

The above y-relating function takes about 1 for $-w/2<y<w/2$ and takes 0 for $y<-w/2$ or $w/2<y$. A whole beam distribution function relying upon Fermi's function is obtained by combining the above x-direction function and the y-direction function.

$$[\exp[-\beta\{x-g+(q/2)\}]+1]^{-1}[\exp[\beta\{x-g-(q/2)\}]+1]^{-1}$$
$$[\exp[-\beta\{y+(w/2)\}]+1]^{-1}[\exp[\gamma\{y-(w/2)\}]+1]^{-1}$$
$$(\beta/20/q \text{ to } 5/q, g: \text{offset})$$

The above is the expression making use of Fermi's functions for describing quasi-uniform distribution of diffracted beams. Fermi's function gives 0.5 at an interface x−g=q. A series of Fermi's functions enables the superposition to give a value 1 at interfaces as a sum of neighboring beams. Namely Fermi function allows us to choose parameters as q'=q. This choice gives flat, smooth continuation of the superposed, diffracted beams. Inverses of β and γ designate the broadening of beams at edges. Since the diffracted beams should be quasi-uniform, the inverses of β and γ should be ⅕ to 1/20 of q and w. The values of g have been already described for the odd number or even number of DOEs for supergaussian distribution functions.

It is possible to build either a shrinking optical system or an enlarging optical system by assembling only off-axis DOEs without on-axis DOEs, if symmetry is not required. If symmetry is an important condition, a uniform power stripe optical system of the odd number of lasers and DOEs (N=2h+1: h=positive integer) requires a single on-axis DOE. The symmetric odd number optics should be built by installing an on-axis DOE at the center and positioning off-axis DOEs on the sides in the order of increasing diffraction angles.

A symmetric optical system having an even number of lasers and DOEs (N=2h: h=positive integer) can be constructed only by assembling off-axis DOEs.

If the system does not require symmetry, a set of off-axis DOEs can build a desired optical system, even if the number of lasers and DOEs is odd. In any means, what is significant is off-axis DOEs.

A formula for calculating intensity distribution of light diffracted on an image plane by a DOE has been well known. The beam line is taken to be parallel to a z-axis. A plane vertical to the beam line has (x, y) coordinates. Amplitude/phase distribution of an incidence beam is denoted by a(x, y, 0). Changes of a phase and an amplitude induced by passing the DOE are denoted by "t(x, y)". A wave function W(x', y') of the beam diffracted on the image plane (x', y', f) is $$W(x', y')=(jf\lambda)^{-1}\int\int a(x, y)t(x, y)\exp[jk\{(x-x')^{2}+(y-y')^{2}\}/2f]dx\times dy.$$

Here the integral dx×dy should be done on the plane of the DOE. In practice, the DOE is divided into plenty of pixels which have a value for t(x, y). Thus the integral on the DOE should be replaced by summation of the functions with regard to pixels. The incident beam is Gaussian. The incidence amplitude function a(x, y) is denoted by $$a(x, y)=\exp(-2(x^{2}+y^{2})/d^{2}).$$

Extra heights of pixels from a standard height are denoted by Δh(x, y). The DOE function t(x, y) is given by $$t(x, y)=\exp(-j\phi(x, y)),$$

where the phase function φ(x, y) is expressed by $$\phi(x, y)=2\pi(n-1)\Delta h(x, y)/\lambda.$$

W(x', y') in the above equation is a quasi-uniform power distribution wave function on the image (x', y', f). W(x', y') is calculated by giving the phase (p(x, y) to each pixel and summing the product following the double integral for all pixels. If the calculated W(x', y') coincides with the above-mentioned quasi-uniform distribution function, for example, a supergaussian or Fermi's function, the t(x, y) is a desirable solution giving probable pixel phases φ(x, y) or heights Δh(x, y) of the DOE. If W(x', y') deviates from the predetermined quasi-uniform distribution function, the phase function φ(x, y) should be amended for reducing the difference.

The present invention proposes an off-axis optical system which produces a stripe-sectioned uniform power density beam from a plurality of beams emitted from lasers by aligning the lasers side by side in an x-direction at a pitch p, aligning off-axis type DOEs, which diffract laser Gaussian beams into off-axis rectangle sectioned uniform beams at definite diffraction angles, on extensions of the lasers side by side in an order of higher diffraction angles on outer sides, making a plurality of rectangle-sectioned uniform power beams, superposing the rectangle-sectioned uniform power beams with smooth continuity at fringes, and forming a long stripe sectioned uniform beam on an image plane. Off-axis DOEs are dominant, main, indispensable optical parts in the present invention. The whole of the optical system can be constructed only with the off-axis type DOEs. Symmetric even-number DOE systems can be built without on-axis DOEs. Asymmetric odd-number DOE systems can be built without on-axis DOEs. An on-axis DOE can be included in the optical system of the invention in the case of symmetric odd-number DOEs.

The diffracted beam should not have perfect uniform power density (tophat) but should have quasi-uniform density having a flat middle plateau and continually falling sides. The continually falling sides are necessary for superposing neighboring quasi-uniform beams without discontinuity at boundaries (fringes). Thus high order number parameter m is not desirable for supergaussian functions for the beam density. This invention takes supergaussian order parameters m between m=3 and m=20. Two neighboring beams are partially superposed at joints. The beam power density is a sum of the neighboring beams at the joints since two beams are superposed. There is no anxiety of interference at the joints, because the light sources are independent and incoherent.

The number of lasers is denoted by "N". The lasers are aligned in series at a pitch p. The width of laser arrangement in an x-direction is Np. The total width of continually superposed beams is Nq on the image plane. In the shrinking type off-axis system, the total width of the superposed diffracted beam is shorter than the total width of the arrange lasers (Nq<Np). The laser beam power is concentrated into higher power light on the image plane suitable for heat treatment. The superposed unified beam has quasi uniform density in the stripe (long rectangle) section. Objects can be heat-treated, for example, welding, annealing, cutting by irradiating objects with the stripe-sectioned uniform density beam. The beam is an assembly of diverging (or converging) slanting rays. Diffracted beams are partially superposed at joints. The density of power is continual and uniform also near the joints. The superposed beam is a nearly uniform stripe beam with side moderate slopes on the objects.

The off-axis DOE plays a role of making a rectangular-sectioned, quasi-uniform density beam at an off-axis spot on the image plane by diffracting the laser beam with a definite oblique angle. Since the beam is diffracted at a slanting direction, the DOE is a new, strange optical element endowed with new functions and advantages. An ordinary on-axis type DOE is annoyed with the 0-th order noise, which progresses along a straight line without being diffracted. But the off-axis DOE proposed by the present invention is fully immune from the 0-th order noise, because the DOE diffracts an input laser beam at a slanting direction. The off-axis DOE can suppress plus sign higher order diffraction rays. The higher order (+2 nd, +3 rd, +4 th, . . . ) diffraction rays, which have larger oblique angles, are diverted from objects. Thus the off-axis DOE can exclude fully unnecessary light components, for example, the 0-th order noise and plus higher order diffraction rays. The effect of elimination of the 0-th order noise is, in particular, a big advantage of the present invention.

The use of off-axis DOEs facilitates the production of shrinking optical systems or enlarging optical systems. The off-axis DOEs have far higher degree of freedom than on-axis DOEs. The off-axis DOEs are superior to the on-axis DOEs in the degree of freedom, suppression of noise and concentration of laser power.

BRIEF DESCRIPTION OF THE DRAWINGS

FIG. 17($b$) shows a virtual superposing DOE optical system having three on-axis DOEs for transforming Gaussian beams into enlarging uniform beams, superposing the enlarging beams into a uniform, unified beam on the image plane, which has the same width as the sum of the DOEs.

FIG. 18($b$) shows a virtual superposing DOE optical system having three on-axis DOEs for transforming Gaussian beams into enlarging uniform beams, superposing the enlarging beams into a uniform, unified beam on the image plane, which has the same width as the sum of the DOEs.

DETAILED DESCRIPTION OF THE PREFERRED EMBODIMENTS

Figure 1:
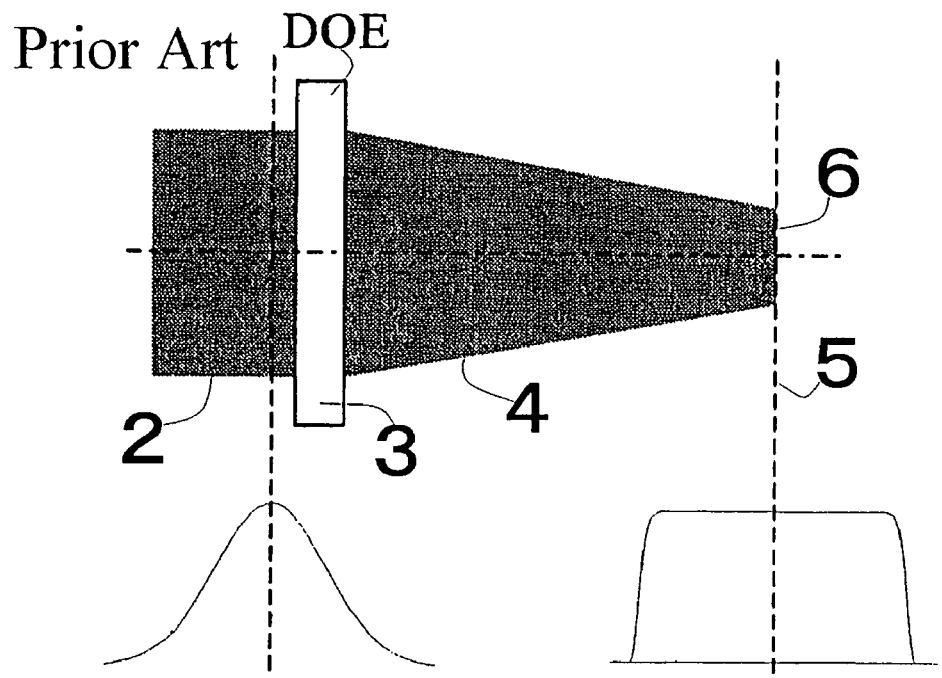
FIG. 1 is an explanatory view of a conventional DOE optical system for diffracting a wide, rotationally-symmetric, round sectioned Gaussian beam emitted from a laser to a narrow, round sectioned uniform power beam formed on an image plane. An under left mountain denotes the power distribution of the laser-emitted Gaussian beam with an abscissa of a radius. An under right rectangle denotes the power distribution of the uniformed, round diffracted beam with an abscissa of the radius.
Figure 2:
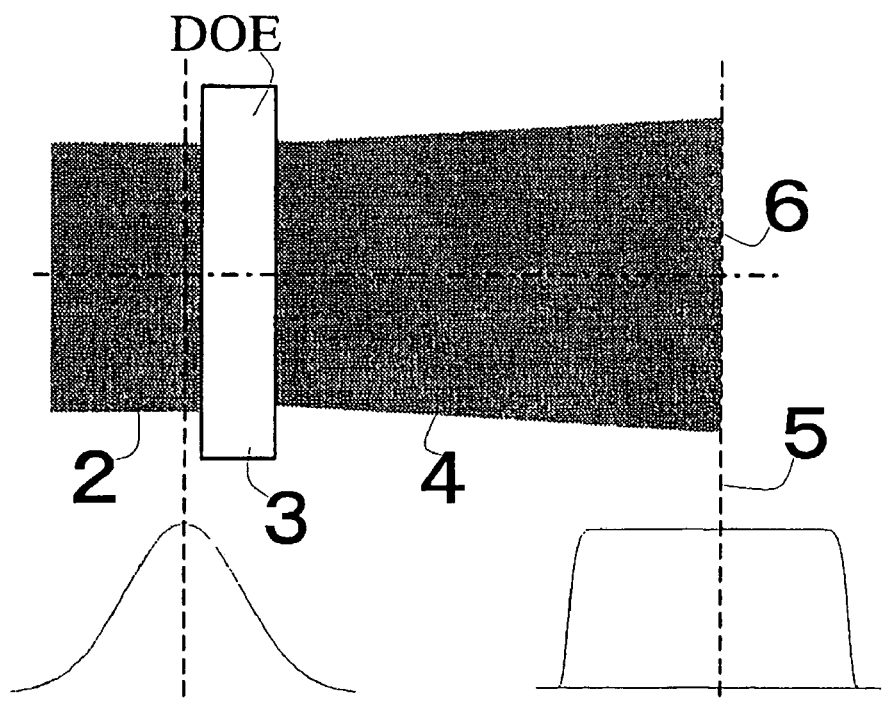
FIG. 2 is an explanatory view of an imaginary, virtual DOE optical system for diffracting a rotationally-symmetric, round sectioned Gaussian beam emitted from a laser to an enlarged, round sectioned uniform power beam. An under left mountain denotes the power distribution of the laser-emitted Gaussian beam with an abscissa of a radius. An under right rectangle denotes the power distribution of the enlarged, uniform power diffracted beam with an abscissa of the radius.
Figure 3:
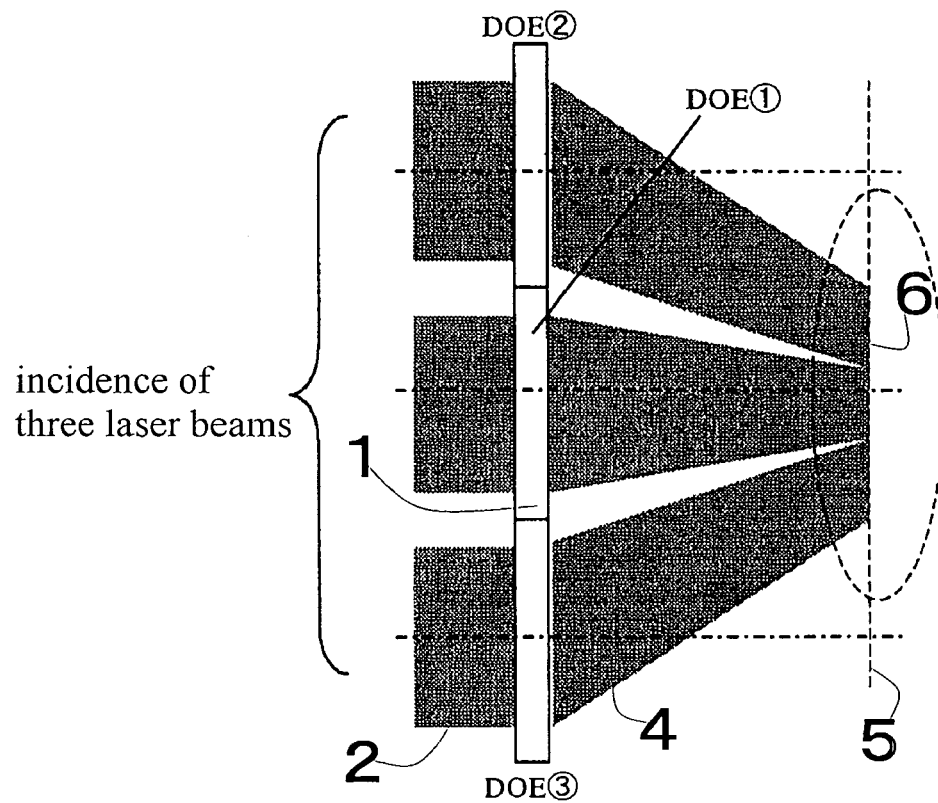
FIG. 3 is a schematic view of a homogenizer optical system of the present invention making use of a plurality of off-axis and on-axis DOEs for diffracting a plurality of rotationally-symmetric Gaussian distribution laser beams into a shrunk rectangle-sectioned quasi-uniform power beam. This embodiment shows three lasers and three DOEs. The number of the lasers and DOEs can be arbitrarily determined in the present invention by taking account of the shape and size of the object beam. Upper and lower DOEs are off-axis DOEs which play an essential role of the present invention.
Figure 4:
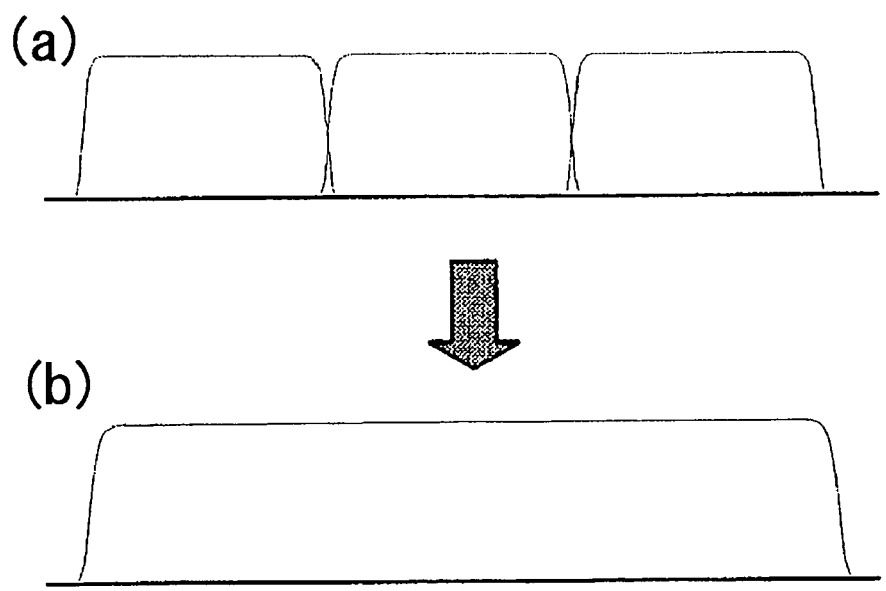
FIG. 4(a) is a graph of three equivalents, quasi-uniform, rectangle-sectioned power beams made on an image plane by the three off-axis and on-axis DOEs.
FIG. 4(b) is a graph for showing that the sum of the three equivalent, quasi-uniform, rectangle-sectioned power beams has uniform power distribution on the image plane.

FIG. 3 shows an example of a superposing DOE homogenizer of the present invention making use of three DOEs in a beam shrinking case. FIG. 4($a$) denotes the power distribution of three diffracted beams on an image plane (I). FIG. 4($b$) denotes the power distribution of a unified, superposed beam on the image plane (I). The example assembles a first DOE, a second DOE and a third DOE aligning in series in a base line vertical to beam lines. The number of sets of DOEs and lasers is three in the example. But the number of DOE/laser sets can be chosen to be an arbitrary integer, i.e., 2, 4, 5, 6 . . . . When the DOE/laser number m is an even integer, the whole DOE system can be built with off-axis DOEs without an on-axis DOE. When the DOE/laser number m is an odd integer, one on-axis DOE is required for making a symmetric system. But if the symmetry is not required, a homogenizer system can be composed only by off-axis DOEs for both even integer m and odd integer m. The beam propagating direction is denoted by a z-axis. Each laser is parallel to the z-direction. DOEs and lasers are arranged in series side by side in parallel to the x-direction. DOEs and an image plane are parallel to a xy-plane. The output stripe-sectioned beam diffracted by the DOEs on the image plane expands in the x-direction.

In the example of FIG. 3, a middle DOE (1) is an on-axis type. Side DOE (2) and DOE (3) are an off-axis type. Three equivalent lasers (not shown) are positioned in front of the DOEs. The three lasers emit parallel Gaussian beams. The laser Gaussian beams go in parallel into the DOEs (2), (1) and (3). The distance (laser pitch) between neighboring laser centers is equal to the distance (DOE pitch p) between neighboring DOE centers. The example is a shrinking optical system for reducing the width of beams. The pitch q (image pitch) of diffracted beams on the image (I) is smaller than the DOE pitch p (q<p). A total width of the diffracted unified beam on the image is 3q. A total width of the aligning DOEs is 3p. Here, 3p>3q.

Figure 5:
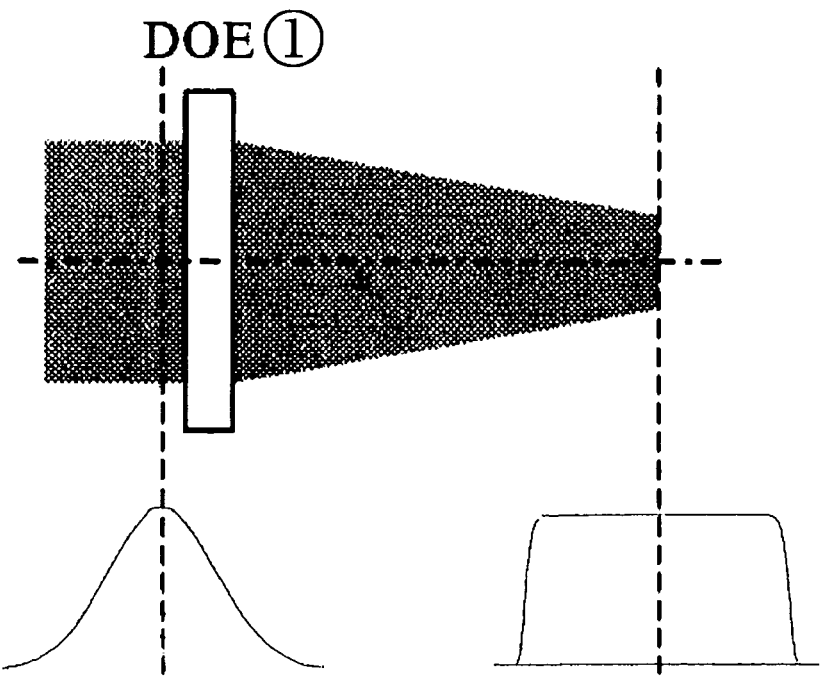
FIG. 5 is an explanatory figure of the central on-axis DOE diffracting a wide Gaussian laser beam into a rectangle-sectioned, uniform power beam formed on the image plane. An under left mountain shows the Gaussian power distribution of the middle laser beam. An under right rectangular mountain denotes the middle rectangular-sectioned, uniformed (tophat) power beam diffracted on the image plane by an on-axis DOE.

The middle on-axis DOE (1) diffracts and shrinks a cylindrical Gaussian laser beam of a diameter d along the beam line (z-direction) into a smaller q×w (q>>w) rectangle quasi-uniform beam as shown in FIG. 5.

Figure 6:
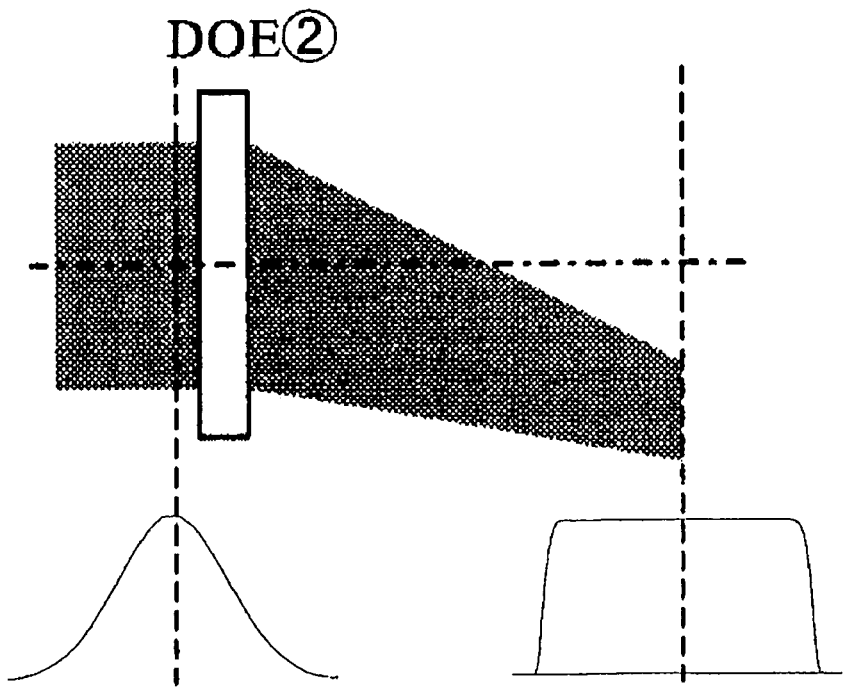
FIG. 6 is an explanatory figure of the upper off-axis DOE diffracting a wide Gaussian laser beam into a rectangle-sectioned, uniform power beam formed on the image plane. An under left mountain shows the Gaussian power distribution of the upper laser beam. An under right rectangular mountain denotes the upper rectangular-sectioned, uniformed (tophat) power beam asymmetrically diffracted at an upper off-axis position on the image plane by the upper off-axis DOE.

The upper off-axis DOE (2) diffracts and shrinks a cylindrical Gaussian laser beam of a diameter d along a downward inclination line (on zx-plane) into a smaller q×w (q>>w) rectangle quasi-uniform beam at an off-axis spot as shown in FIG. 6.

Figure 7:
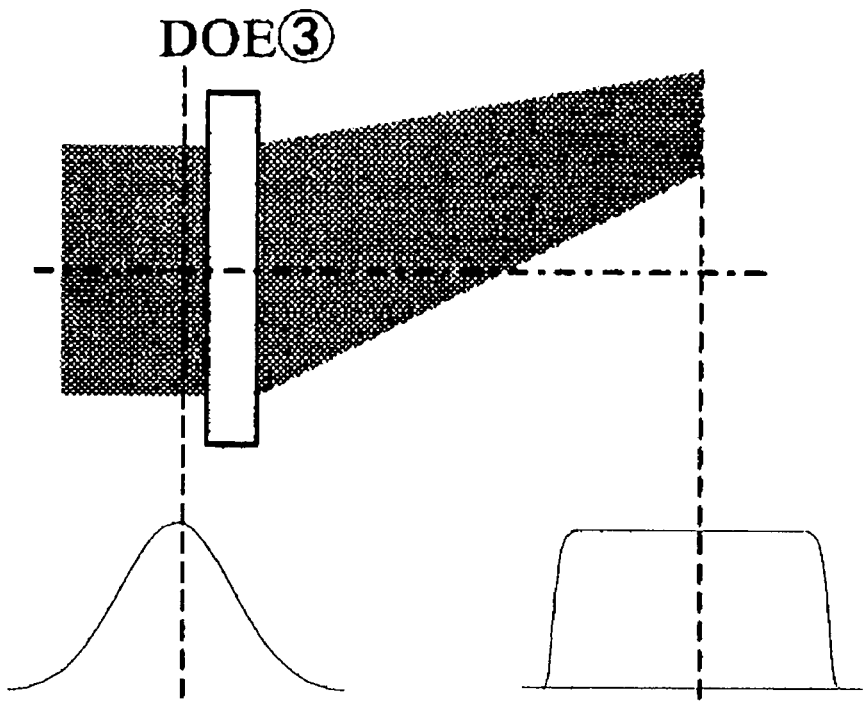
FIG. 7 is an explanatory figure of the lower off-axis DOE diffracting a wide Gaussian laser beam into a rectangle-sectioned, uniform power beam formed on the image plane. An under left mountain shows the Gaussian power distribution of the lower laser beam. An under right rectangular mountain denotes the lower rectangular-sectioned, uniformed (tophat) power beam asymmetrically diffracted at a lower off-axis position on the image plane by the lower off-axis DOE.

The lower off-axis DOE (3) diffracts and shrinks a cylindrical Gaussian laser beam of a diameter d along an upward inclination line (on zx-plane) into a smaller q×w (q>>w) rectangle quasi-uniform beam at an inverse off-axis spot as shown in FIG. 7.

The example of FIG. 3, which assembles off-axis and on-axis DOEs, produces three quasi-uniform, stripe-shaped diffracted beams, superposes the three beams partially at fringes (FIG. 4($a$)) and makes a unified quasi-uniform long 3q×w (3q>>w) stripe sectioned beam (FIG. 4($b$)) on the image.

When only on-axis DOEs are used, p=q, which means that the lateral pitches of DOEs and images would be equal. The present invention, which utilizes off-axis DOEs in preference to on-axis DOEs, is immune from the restriction p=q. Both cases of p>q and p<q can be realized in the present invention.

Interference at the joining regions induces no problem. No interference allows us to partially superpose neighboring laser beams on the image plane at the butting regions. Use of isolated, separated individual lasers denies interference. Interference occurs only between beams which have originally been emitted from the same laser.

Use of off-axis DOEs is the gist of the present invention. The off-axis DOEs can eliminate the 0-th order light component and positive higher order light components. Elimination of the 0-th order and higher order components enables the off-axis DOEs to realize low noise diffraction beams on image planes.

[Advantages of Use of Off-Axis does for Making Shrinking Diffraction Beams]

Figure 17:
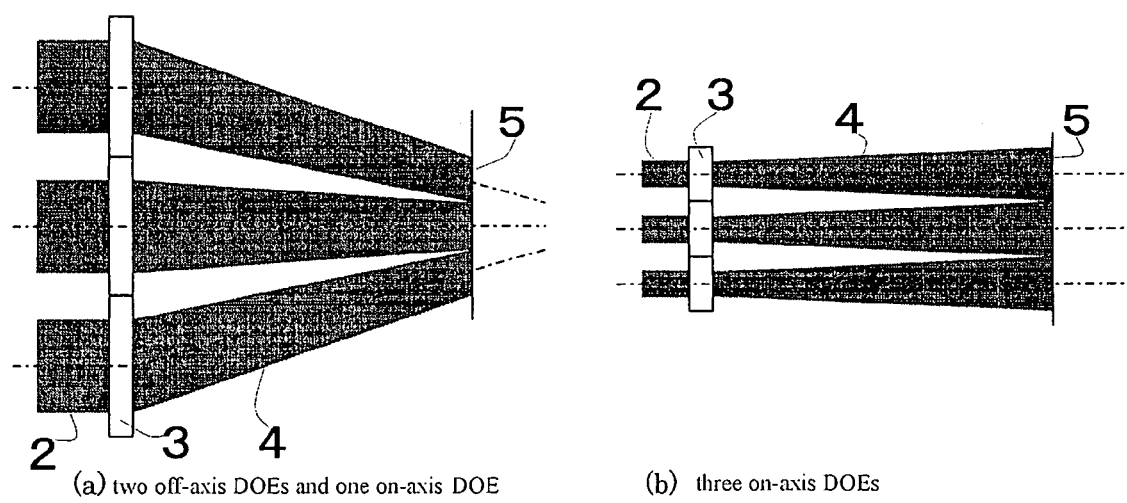
FIG. 17($a$) shows a superposing DOE optical system having two off-axis DOEs and an on-axis DOE for transforming Gaussian beams into shrunk uniform beams, superposing the shrunk beams into a uniform, unified beam, which is wider than the sum of the DOEs, on the image plane in accordance with teaching of the present invention.

FIG. 17 shows an off-axis optical system (FIG. 17($a$)) and an on-axis optical system (FIG. 17($b$)) for size shrinking cases. The on-axis optical system requires that the laser pitch p should be equal to a DOE arranging pitch. In the case of the on-axis optical system of FIG. 17(b), short light zones (mq) require reduction of the pitch p and the size of the DOEs and the size of the lasers. When the object requires large light power, the small-sized lasers are useless. The on-axis optical system is incompetent for building an apparatus requiring large power density.

On the contrary, the present invention relying on off-axis DOEs has high degree of freedom. When the size of diffracted beams on an image plane is predetermined, the pitch of aligning lasers is not determined thereby. Even when the pitch of aligning lasers is predetermined, the size of the rectangle diffracted beam on an image is not determined. The size of the diffracted beams and the laser aligning pitch are independent parameters. The high degree of freedom derives from the adoption of off-axis type DOEs of the present invention. The high degree of freedom is one of advantages of the present invention.

This invention can satisfy another requirement of preparing a diffraction beam having a short stripe (short Nq) section with high power. In the case, high power lasers should be arranged in parallel along a line. High power lasers have a large width, which widens the pitch p of an array of lasers. The wide pitch would weaken light power on the image plane in the case of on-axis DOEs. Use of off-axis type DOEs easily solve the difficulty. Off-axis DOEs can be endowed with a converging function. In spite of the wide pitch of the laser array, the off-axis DOEs can make strong power density beams by converging laser beams on the image plane.

$$\text{Diffraction Limit} = (4/\pi)(f\lambda/D)$$

Here, f is a focal length of the DOE, $\lambda$ is a wavelength of the incidence laser light, and D is a beam diameter of the incidence laser beam. The off-axis type shrinking optical system can make use of a large diameter D of the incidence laser beam. The shrinking optical system can reduce the value of the diffraction limit by raising D. The diffraction limit determines the minimum resolution. The resolution is improved by the shrinking off-axis optical system. High resolution is one of the advantages of the shrinking type optical system built by the present invention.

[Advantages of Use of Off-Axis does for Making Enlarging Diffraction Beams]

Figure 18:
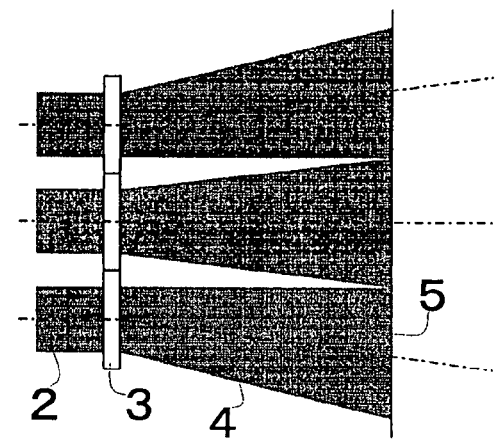
FIG. 18($a$) shows a superposing DOE optical system having two off-axis DOEs and an on-axis DOE for transforming Gaussian beams into enlarging uniform beams, superposing the enlarging beams into a uniform, unified beam, which is wider than the sum of the DOEs, on the image plane in accordance with teaching of the present invention.
Figure 18:
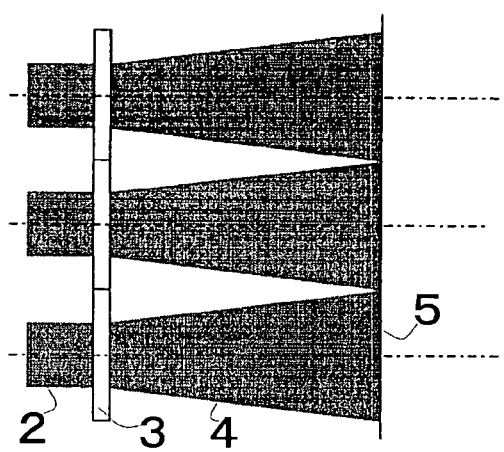

FIG. 18 compares an enlarging off-axis optical system (FIG. 18(a): the present invention) with an enlarging on-axis optical system (FIG. 18(b): imaginary example not prior art). The present invention has high degree of freedom. In FIG. 18, superposed beams extend along an x-axis on an image plane 5. Even when the size of a rectangular uniform beam on an image is predetermined, the laser aligning pitch p is not determined. Even when the laser pitch p is predetermined, the size of the rectangular uniform beam is not determined by the laser pitch p. Both the laser pitch p and the image size are independent parameters which can be arbitrarily designed.

On the contrary, the virtual on-axis (not prior art) optical system of FIG. 18(b) aligns a plurality of lasers at the same pitch as the pitch of the diffracted beams aligning in the x-direction on the image. The laser axes should always coincide with the centers of the diffracted beams. For a set of enlarged superposed beams, the on-axis type should enlarge the laser aligning pitch p for satisfying an equation p=q. Increment of the pitch of aligning the lasers and DOEs would enlarge the whole size of the on-axis type optical system. A bulky apparatus is undesirable since the apparatus would occupy an extra wide space in factories. The imaginary on-axis optical system would be inferior to the off-axis one designed by teaching of the present invention.

The off-axis type of FIG. 18(a) of the present invention enables lasers to align at a reduced pitch p and DOEs to be miniaturized. The reduction of pitch can cut the size of the whole apparatus. The off-axis optical system has an advantage of reducing the area occupied by the apparatus.

EMBODIMENT 1

[Disposition of doe Homogenizer (FIG. 8)]

Figure 8:
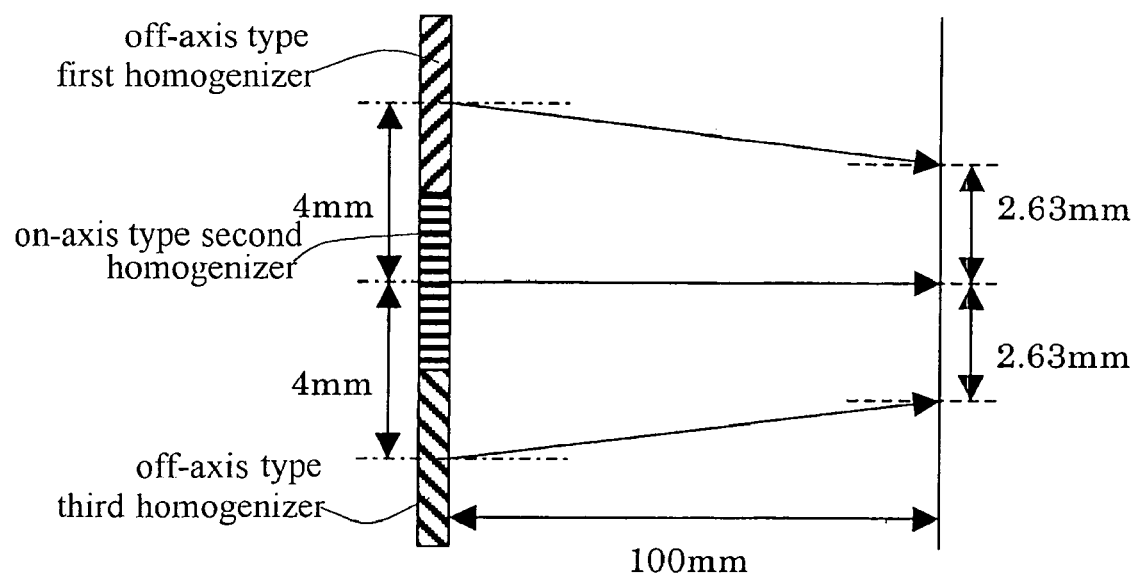
FIG. 8 is a plan view showing dimensions of the three DOEs, the images and the spacing of the embodiment of FIG. 3.

An embodiment of utilizing three DOEs like the example shown by FIG. 3 is described. FIG. 8 shows a disposition of three DOEs and an image plane superposing three images made by the DOEs. A homogenizer is an optical system aligning three DOEs in contact on a plane vertical to a beam line. A first homogenizer is an off-axis type DOE. A second homogenizer is an on-axis type DOE. A third homogenizer is an off-axis type DOE. A distance between the center of the first homogenizer DOE and the center of the second homogenizer DOE is 4 mm. A distance between the center of the second DOE and the center of the third DOE is 4 mm. Three lasers supply three parallel Gaussian beams to the three DOEs. Namely, the pitch (p) of three lasers and DOEs is p=4 mm. A beam pitch is reduced to q=2.63 mm on the image plane. A distance between a DOE plane and the image plane is 100 mm.

Incidence Condition of Laser Beams into Doe Homogenizers (Common to Three DOEs) Wavelength of Laser Beam: $\lambda$=532 nm (SHG-YAG Laser)

Beam diameter: $\phi$2 mm

Emission angle: 0 mead (parallel beam)

Mode: $TEM_{OO}$ (ideal Gaussian profile)

A light source is an SHG-YAG laser. The wavelength of the beam emitted from the laser is 532 nm. The diameter of the beam is 2 mm$\phi$. The edge of a Gaussian beam is defined at a point at which the power density falls to $e^{-2}$ times as small as the maximum power. The zero emission angle means that the beam is a perfect parallel beam. The power distribution of the laser is Gaussian.

Figure 10:
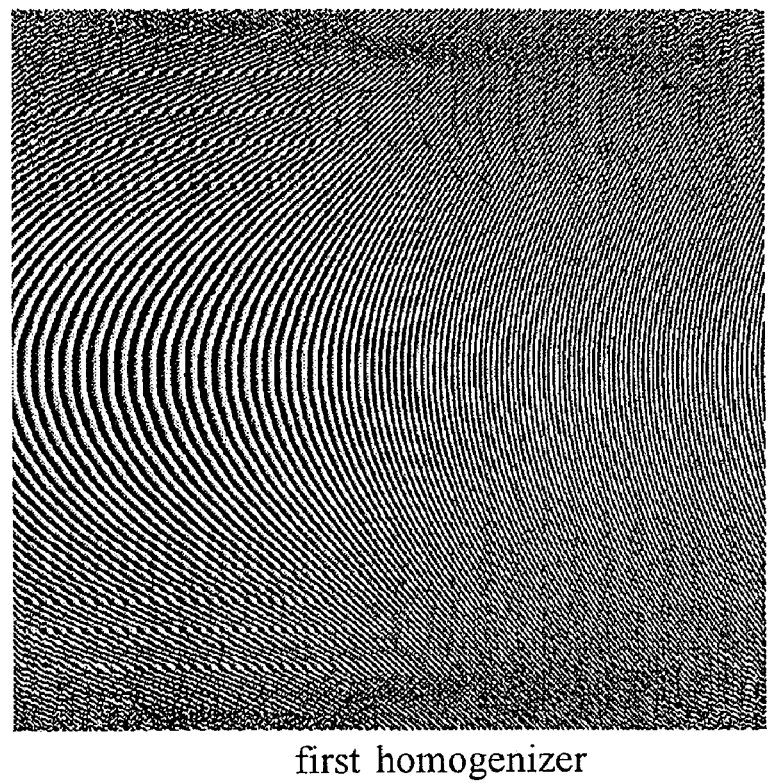
FIG. 10 a two-dimensional phase distribution (pixel heights or thickness) of a first homogenizer (off-axis) DOE of the embodiment making use of three DOEs. Tones from white, via grey, to black signify a 16 step variation of thickness, height or phase of pixels. A single stripe, which contains 16 steps, denotes a difference of height, thickness or phase of a single wavelength. A set of gross convex concentric arcs appears on the left region.

First DOE Homogenizer (FIG. 10; Off-Axis)

Diffraction efficiency: 90.53%

Pixel size: 5 $\mu$m×5 $\mu$m

Figure 9:
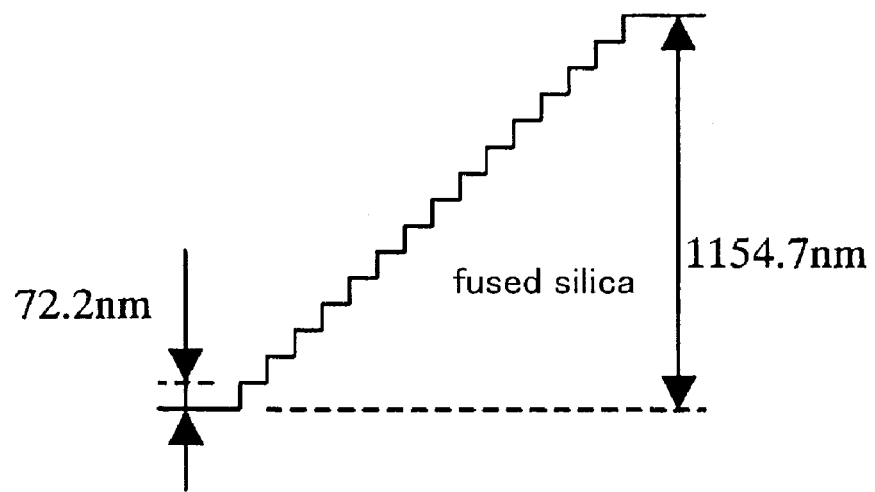
FIG. 9 shows steps of heights of pixels formed on the homogenizer DOE of the embodiment of the present invention.

Phase step number: 16 steps (FIG. 9)

Pixel number: 800 pixels×800 pixels

Material: fused silica (at $\lambda$=532 nm, n=1.460706343)

Focal length: f=100 mm

Object beam shape: 3.0 mm ($e^{-2}$ diameter)×0.1 mm ($e^{-2}$ diameter), stripe Supergaussian order number: 3.4 th order×2 nd order Off-axis deviation of off-axis DOE: 2.7 mm on image plane AR-coating on both surfaces of DOE: transparency more than 99%

A DOE shown in FIG. 10 is built by pixels which are minimum, fundamental elements. A DOE is an assembly of pixels. A pixel is a square of 5 $\mu$m×5 $\mu$m. A definite height (or thickness) is allotted to a pixel in a DOE. The DOE has 800 pixels×800 pixels. An effective region of the DOE which the pixels occupy is 4000 $\mu$m×4000 $\mu$m. The DOE is made of fused silica. The refractive index is n=1.460706343 at $\lambda$=532 nm. The focal length f can be defined for the DOE, since the DOE has a function of convergence like a convex lens.

The phase step number means the number of steps which can be allocated to pixels. In the example, the phase step number is 16. The pixels can take 16 different steps. FIG. 9 signifies the 16 steps of pixels. The phase step number is order of the power of 2. The 16 step number is not so large. 256 steps, 128 steps, 64 steps or 32 steps can be chosen as the number of phase steps of DOEs. The more the step number rises, the higher the resolution of diffracted images increases. The purpose of the present invention is not to build complicated diffraction patterns but to make simple uniform power distribution patterns on an image plane. Such a small number of steps is chosen for the steps of the DOEs. Off course 8 steps are also available. If the phase number is s and the unit step height is $\epsilon$, the product $s\epsilon$ should coincide with a single wavelength difference. Thus, $s\epsilon(n-1)=\lambda$. The unit step height $\epsilon$ is given by $\epsilon=\lambda/(n-1)s$.

The example shown in FIG. 9 is a DOE step model having 16 steps (s=16). One step has a 72.2 nm height ($\epsilon$=72.2 nm). The total height is 1154.7 nm ($s\epsilon$=1154.7 nm) which corresponds to a single wavelength path difference, namely, $s\epsilon=\lambda/(n-1)$. The beam diffracted by the DOE on the image plane has a stripe section of 3.0 mm×0.1 mm (q'=3.0 mm and w=0.1 mm). Here, the edge of a beam is defined as a spot where the power density falls to $1/e^2$ of the central power density. 3.4 is the supergaussian order number of the x-direction extension q=2.63 mm and 2 is the supergaussian order number of the y-direction extension w=0.1 mm. An explicit expression of the diffracted beam density on the image is given by $$\exp\{-2(2(x+q)/3)^{3.4}\}\exp\{-2(2y/0.1)^2\}.$$

The reason why an x-direction (horizontal) coordinate has (x+q) is that the outstanding DOE is an off-axis type DOE having an off-axis center at x=−q=−2.63 mm and y=0. The divisor 3 in the first supergaussian is the x-direction beam size (length) q'=3.0 mm. The half size of the x-direction is 3/2. The number 2 is included as a head multiplier 2 of 2(x+q). The other divisor 0.1 in the second supergaussian is the y-direction beam size (width) w=0.1 mm. The half size of the y-direction is 0.1/2. The number 2 is included as a head multiplier 2 of 2y.

As described before, the longitudinal x-direction size q'=3.0 mm of the diffracted beam does not necessarily coincide with the longitudinal pitch q=2.63 mm of the diffracted beams. The discrepancy derives from the definition of the edges of beams not at the spot of a fall to 0.5 but at the spot of a fall to $e^{-2}$ of the maximum power due to the supergaussian function. The supergaussian falls about 0.5 at (x+q)=2.63/2 and falls about $e^{-2}$ at (x+q)=3/2. If a Fermi function is employed for expressing the diffracted beam power distribution, the edge q' coincides with the pitch q of the superposition (q'=q). Both the supergaussian and the Fermi function are suitable for representing the diffracted beam power distribution. Other quasi-uniform functions are also available.

In the example, the diffraction efficiency is 90.53%, which seems to be a slightly low value. The reduction of about 10% is caused by off-axis type slanting diffraction instead of vertical diffraction.

FIG. 10 is a diagram showing height (phase) distribution of pixels of the first DOE by monotone variation from black to white. A change from white to black corresponds to the full 16 steps of variation of thickness (heights or phase). A DOE is built with 800×800 pixels= 640000 pixels. Thickness is represented by a variation of dense/dilute (black/white) monotone. A set of concentric arcs being strongly convex leftward appears at the left of FIG. 10.

Curvatures of the concentric arcs decrease from left to right. Like a Fresnel lens, the concentric arcs have a function of bending and converging a beam to the right. The macroscopic concentric arcs make an image at an off-axis spot on the image.

The leftward arcs have steep slanting curves near ends. The slanting angles are about 20 degrees to 40 degrees. The slanting curves have a function of converging a beam in the y-direction into a thin stripe (small w; w=0.1 mm).

Second DOE Homogenizer (FIG. 11; on-Axis)
Diffraction efficiency: 96.54%
Pixel size: 5 $\mu$m×5 $\mu$m
Phase step number: 16 steps (FIG. 9)
Pixel number: 800 pixels×800 pixels
Material: fused silica (at $\lambda$=532 nm, n=1.460706343)
Focal length: f=100 mm
Object beam shape: 3.0 mm ($e^{-2}$ diameter)×0.1 mm ($e^{-2}$ diameter), stripe
Supergaussian order number: 3.4 th order×2 nd order
On-axis type DOE: deviation 0
AR-coating on both surfaces of DOE: transparency more than 99%

A pixel is a square of 5 $\mu$m×5 $\mu$m. A definite height (or thickness) is allotted to a pixel in a DOE. The DOE has 64000 pixels=800 pixels×800 pixels. An effective region of the DOE which the pixels occupy is 4000 $\mu$m×4000 $\mu$m. The DOE is made of fused silica. The focal length is f=100 mm. The diffracted beam size is 3 mm×0.1 mm.

The second DOE is an on-axis type. The diffracted beam has a center at x=0 and y=0. The supergaussian function of the striped uniform beam diffracted by the second DOE is represented by $$\exp\{-2(2x/3)^{3.4}\}\exp\{-2(2y/0.1)^2\}.$$

In the example, the diffraction efficiency is 96.54%. The high efficiency drives from the on-axis property.

Figure 11:
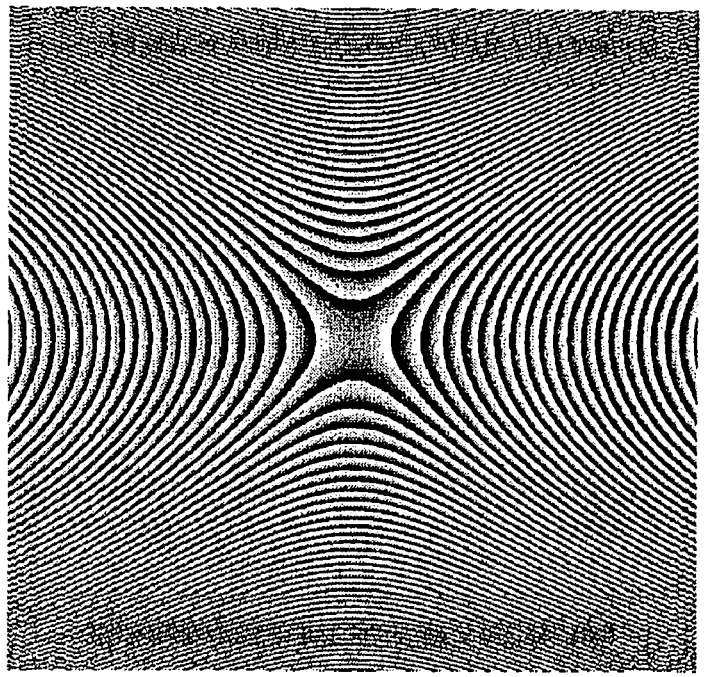
FIG. 11 a two-dimensional phase distribution (pixel heights or thickness) of a second homogenizer (on-axis) DOE of the embodiment making use of three DOEs. Tones from white, via grey, to black signify a 16 step variation of thickness, height or phase of pixels. A single stripe, which contains 16 steps, denotes a difference of height, thickness or phase of a single wavelength. Four sets of concentric hyperbolas appear on the whole.

FIG. 11 is a diagram showing height (phase) distribution of pixels of the second DOE by monotone variation from black to white. The DOE has a converging function of the focal length of 100 mm. If a cylindrical beam should be reduced to a smaller cylindrical beam, the DOE should have a set of concentric circles resembling a Fresnel lens. But the DOE makes not a cylindrical beam but a stripe-sectioned beam. Fringes of the DOE do not make a set of concentric circles but four sets of conjugate curves similar to hyperbolae. Upper and lower conjugate arcs have smaller periods of repetitions. This is because the y-direction reduction rate is larger (beam reduction to w=0.1 mm in the y-direction). Right and left conjugate arcs have larger periods, which means the x-direction reduction is smaller (reduction to q=3 mm in the x-direction). One fringe (black-white) corresponds to a single wavelength difference. Smaller fringe intervals mean larger diffraction angles. Fringes diverge outward, which signifies that the DOE shrinks beams.

Third DOE Homogenizer (FIG. 12; off-Axis)
Diffraction efficiency: 90.52%
Pixel size: 5 $\mu$m×5 $\mu$m
Phase step number: 16 steps (FIG. 9)
Pixel number: 800 pixels×800 pixels
Material: fused silica (at $\lambda$=532 nm, n=1.460706343)
Focal length: f=100 mm
Object beam shape: 3.0 mm ($e^{-2}$ diameter)×0.1 mm ($e^{-2}$ diameter), stripe
Supergaussian order number: 3.4 th order×2 nd order
Off-axis deviation of off-axis DOE: 2.7 mm on image plane
AR-coating on both surfaces of DOE: transparency more than 99%

The DOE makes a stripe beam at x=+q on the image plane. An explicit expression of the diffracted beam density is given by $$\exp\{-2(2(x-q)/3)^{3.4}\}\exp\{-2(2y/0.1)^2\}.$$

In the example, the diffraction efficiency is 90.52%, which seems to be a slightly low value. The reduction of about 10% is caused by off-axis, slanting diffraction instead of vertical diffraction.

Figure 12:
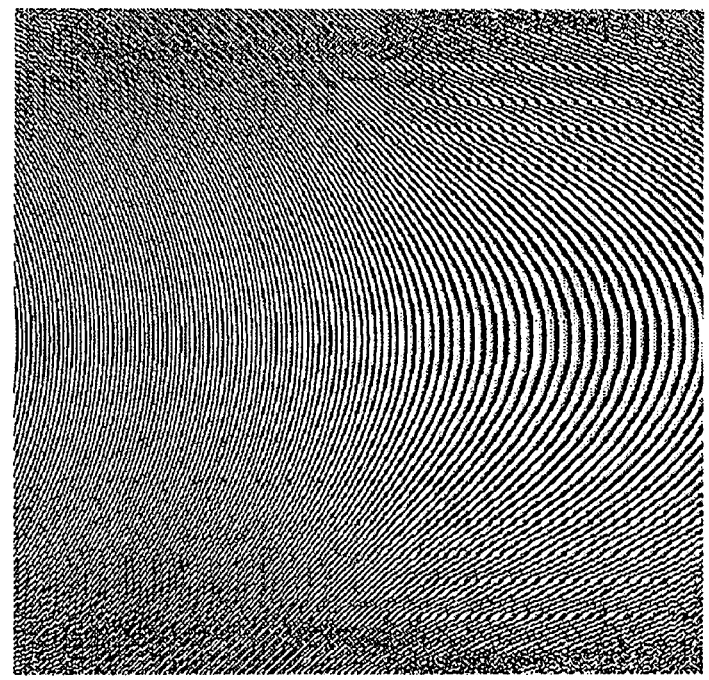
FIG. 12 a two-dimensional phase distribution (pixel heights or thickness) of a third homogenizer (off-axis) DOE of the embodiment making use of three DOEs. Tones from white, via grey, to black signify a 16 step variation of thickness, height or phase of pixels. A single stripe, which contains 16 steps, denotes a difference of height, thickness or phase of a single wavelength. A set of gross convex concentric arcs appears on the right region.

FIG. 12 is a diagram showing heights (phases) distribution of pixels of the third DOE by monotone variation from black to white.

A set of concentric arcs being strongly convex rightward appears at the right of FIG. 12. The curvature of the concentric arcs decreases from right to left. Like a Fresnel lens, the concentric arcs have a function of bending and converging a beam to the left. The macroscopic concentric arcs make an image at an off-axis spot on the image.

Apparently horizontal fringes, which converge beams in the y-direction, are fewer than vertical fringes. The rightward convex arcs have steep slanting curves near ends. The slanting angles are about 20 degrees to 40 degrees. The slanting curves have a function of converging a beam in the y-direction into a thin stripe (small w; w=0.1 mm).

Figure 13:
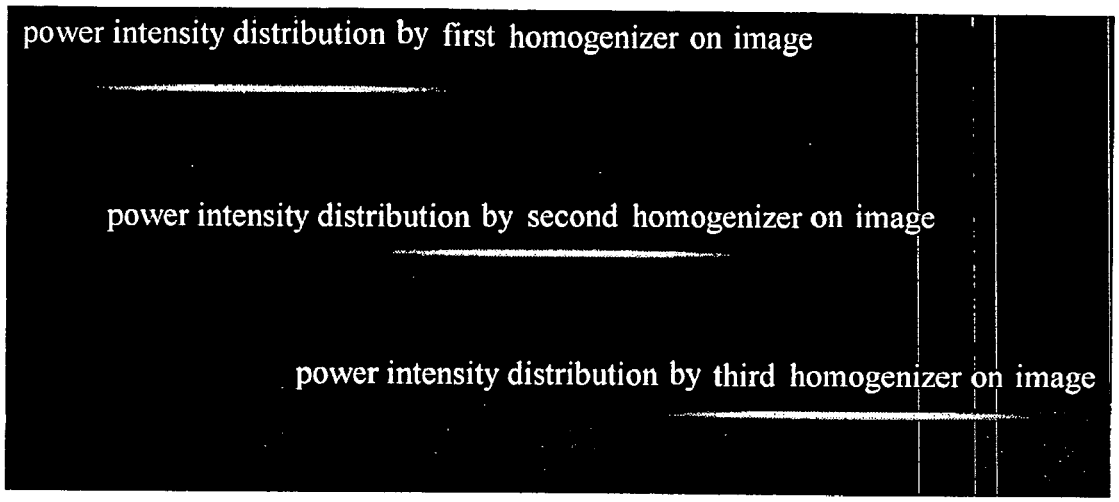
FIG. 13 shows light power intensity distribution on the image produced by the first homogenizer DOE, the second homogenizer DOE and the third homogenizer DOE of the embodiment of the present invention by white slots on a black background.

FIG. 13 shows beam intensity distributions produced by the first DOE, second DOE and third DOE by white slots appearing on a black background. The white slots seem like needles with sharpened edges. The white needle denotes not the spatial distribution but the power distribution. The beam section is a regular rectangle of 3 mm×0.1 mm. The first DOE makes a quasi-uniform beam having a center x=−2.63 mm shown in an upper left region in FIG. 13. The second DOE makes a quasi-uniform beam having a center x=0 mm shown in a middle region in FIG. 13. The third DOE makes a quasi-uniform beam having a center x=+2.63 mm shown in a lower right region in FIG. 13.

Figure 14:
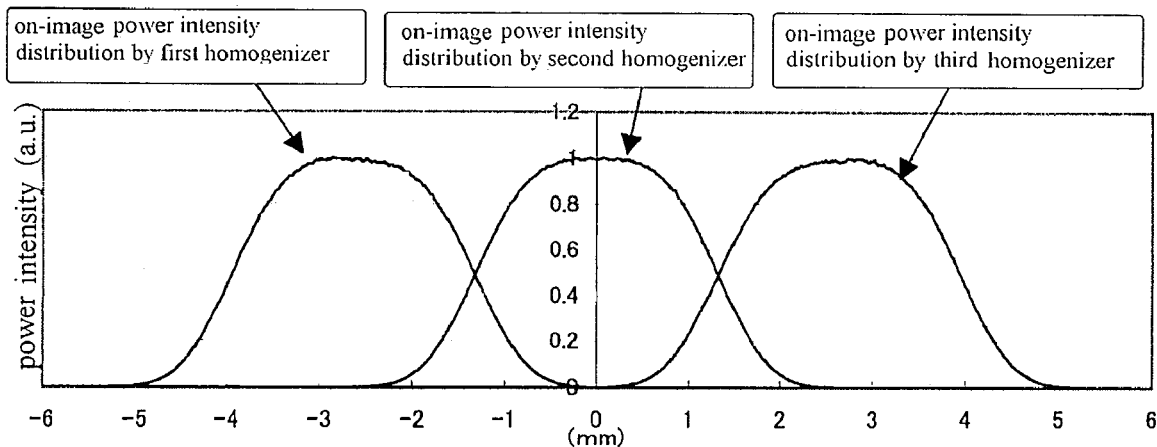
FIG. 14 is a graph showing light power intensity distribution on the image produced by the first homogenizer DOE, the second homogenizer DOE and the third homogenizer DOE of the embodiment of the present invention. An abscissa is a longitudinal coordinate x-coordinate) vertical to diffracted beams. An ordinate is intensity distribution of the beams by the DOEs.

FIG. 14 is a graph showing the same beam intensity distributions prepared by the DOEs. An abscissa is the x-coordinate (mm). An ordinate is the power density, which takes 1 at the maximums of diffracted beams. The diffracted beams are not rigorously uniform step functions (tophat) but round hills with mild slopes. The hills resemble Gaussian. The beam distribution hills are not Gaussians but supergaussians of an order parameter m=3.4. Middle plateaus are wider and flatter than Gaussians. Since a beam edge is defined as a spot of power attenuation to $e^{-2}$=0.13. The length x-direction extension) of the beam is q'=3 mm in the figure. But neighboring hills should be superposed at points of attenuation to 0.5. The pitch of superposition is q=2.63 mm. Thus q is shorter than q'. A full length of the hill is about 5 mm. An overlapping depth is about (5−2.63)mm/2=1.185 mm.

Figure 15:
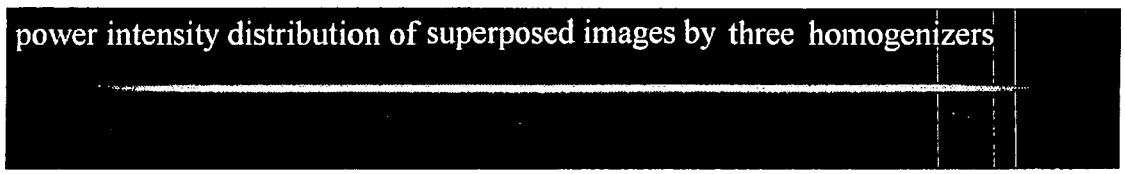
FIG. 15 shows a superposed sum of light powers produced on the image by the first homogenizer DOE, the second homogenizer DOE and the third homogenizer DOE of the embodiment of the present invention by a white slot on a black background.

FIG. 15 shows an intensity distribution of the unified, superposed beam on the image plane by a long white slot appearing on a black background. The white slot like a sharp needle denotes not the spatial distribution but the power distribution. The white slot denotes mild uniformity of power density in the longitudinal direction x-direction).

Figure 16:
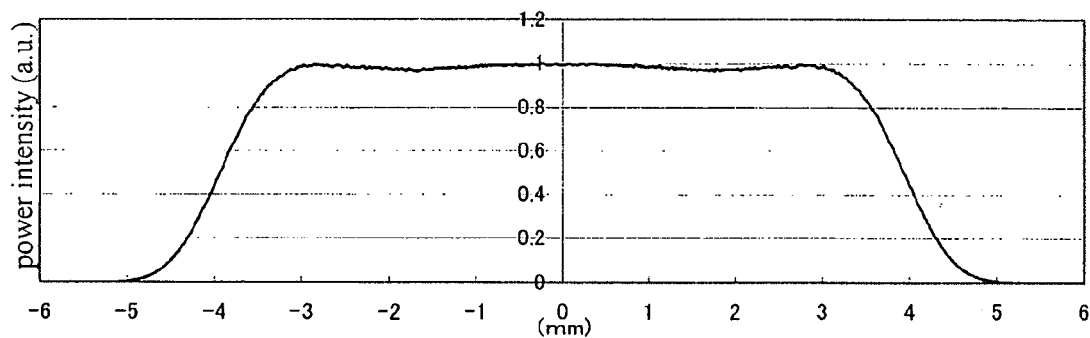
FIG. 16 is a graph showing a superposed sum of light power intensities on the image produced by the first homogenizer DOE, the second homogenizer DOE and the third homogenizer DOE of the embodiment of the present invention. An abscissa is a longitudinal coordinate x-coordinate) vertical to the diffracted beams. An ordinate is intensity distribution of the beams by the DOEs.

FIG. 16 is a graph showing the same intensity distribution of the superposed beam. An abscissa is the x coordinate. An ordinate is superposed power density. A unified, long hill with a flat plateau appears. The power is nearly constant in a 6.4 mm long zone between −3.2 mm and +3.2 mm.

Both sides have blunt slopes deriving from low order parameter supergaussians. The appearance of sloping sides is unavoidable The power distribution has a wide flat plateau of a 6.4 mm length. Uniform power irradiation can be realized by placing an object within the plateau and scanning the object in the y-direction.

I claim:

1. A superposing diffraction optical element (DOE) homogenizer optical system comprising:
    a plurality of parallel lasers emitting Gaussian beams of a diameter d which is twice a distance from a center of the beam to a spot where a power density of the beam falls to $1/e^2$ of a central power of the beam, along beam lines extending in a z-direction and aligning at a pitch p in an x-direction; and
    off-axis DOEs diffracting the Gaussian laser beams at inclining diffraction angles, making quasi-uniform density q×w (q>w) stripe-sectioned beams of a width w and a length q, the length q being smaller than p (p>q) on an image plane I (xy-plane) which is distanced by a focal length f from the DOEs and aligning at the pitch p on an x-direction extending base line K vertical to the beam lines in an order of larger inclining diffraction angles outward and smaller inclining diffraction angles inward on extensions of the beam lines of the lasers,
    the DOEs diffracting and shrinking the laser Gaussian beams into the quasi-uniform density stripe-sectioned beams, superposing the diffracted beams partially at edges and making a unified x-direction extending quasi-uniform beam on the image plane I.

2. The superposing diffraction optical element (DOE) homogenizer optical system according to claim 1, further comprising an extra middle laser emitting Gaussian beams of a diameter d along a beam line extending in the z-direction and an extra on-axis DOE diffracting a Gaussian laser beam of the middle laser along the beam line, making a quasi-uniform density q×w (q>w) stripe-sectioned beam on the image plane I and lying on an extension of the beam line of the extra laser and the off-axis DOEs aligning on both sides or one side of the on-axis DOE in an order of larger inclining diffraction angles outward and smaller inclining diffraction angles inward on extensions of the beam lines of the lasers.

3. The superposing diffraction optical element (DOE) homogenizer optical system according to claim 1, wherein power density of the quasi-uniform power density stripe-sectioned beam on the image plane I (xy-plane) by the DOE is represented by a supergaussian function $\exp(-2(2(x-g)/q')^m - 2(2y/w)^n)$, where q' is a length defined as the distance between neighboring edges of the diffracted beam at which the power density falls to $e^{-2}$ of a maximum power due to the supergaussian function, w is a width, supergaussian coefficients are m=3 to 20 and n=2 to 10, and g is an off-axis value which is a constant.

4. The superposing diffraction optical element (DOE) homogenizer optical system according to claim 1, wherein power density of the quasi-uniform power density stripe-sectioned beam on the image plane I (xy-plane) by the DOE is represented by a Fermi function $[\exp[-\beta\{x+g+(q/2)\}]+1]^{-1}[\exp[\beta\{x-g-(q/2)\}]+1]^{-1}[\exp[-\gamma\{y+(w/2)\}]+1]^{-1}[\exp[\gamma\{y-(w/2)\}]+1]^{-1}$, where q is a length, w is a width, β is β=20/q to 5/q, γ is γ=20/w to 5/w and g is an off-axis value which is a constant.

5. A superposing diffraction optical element (DOE) homogenizer optical system comprising:
    a plurality of parallel lasers emitting Gaussian beams of a diameter d which is twice a distance from a center of the beam to a spot where a power density of the beam falls to 1/e² of a central power of the beam, along beam lines extending in a z-direction and aligning at a pitch p in an x-direction; and off-axis DOEs diffracting the Gaussian laser beams at inclining diffraction angles, making quasi-uniform density q×w (q>w) stripe-sectioned beams of a width w and a length q, the length q being larger than p (p<q) on an image plane I (xy-plane) which is distanced by a focal length f from the DOEs and aligning at the pitch p on an x-direction extending base line K vertical to the beam lines in an order of larger inclining diffraction angles outward and smaller inclining diffraction angles inward on extensions of the beam lines of the lasers, the DOEs diffracting and enlarging the laser Gaussian beams into the quasi-uniform density stripe-sectioned beams, superposing the diffracted beams partially at edges and making a unified x-direction extending quasi-uniform beam on the image plane I.

6. The superposing diffraction optical element (DOE) homogenizer optical system according to claim 5, further comprising an extra middle laser emitting Gaussian beams of a diameter d along a beam line extending in the z-direction and an extra on-axis DOE diffracting a Gaussian laser beam of the middle laser along the beam line, making a quasi-uniform density q×w (q>w) stripe-sectioned beam on the image plane I and lying on an extension of the beam line of the extra laser and the off-axis DOEs aligning on both sides or one side of the on-axis DOE in an order of larger inclining diffraction angles outward and smaller inclining diffraction angles inward on extensions of the beam lines of the lasers.

7. The superposing diffraction optical element (DOE) homogenizer optical system according to claim 5, wherein power density of the quasi-uniform power density stripe-sectioned beam on the image plane I (xy-plane) by the DOE is represented by a supergaussian function $\exp(-2(2(x-g)/q')^m - 2(2y/w)^n)$, where q' is a length defined as the distance between neighboring edges of the diffracted beam at which the power density falls to $e^{-2}$ of a maximum power due to the supergaussian function, w is a width, supergaussian coefficients are m=3 to 20 and n=2 to 10, and g is an off-axis value which is a constant.

8. The superposing diffraction optical element (DOE) homogenizer optical system according to claim 5, wherein power density of the quasi-uniform power density stripe-sectioned beam on the image plane I (xy-plane) by the DOE is represented by a Fermi function $[\exp[-\beta\{x-g+(q/2)\}]+1]^{-1}[\exp[\beta\{x-g-(q/2)\}]+1]^{-1}[\exp[-\beta\{y+(w/2)\}]+1]^{-1}[\exp[\gamma\{y-(w/2)\}]+1]^{-1}$, where q is a length, w is a width, β is β=20/q to 5/q, γ is β=20/w to 5/w and g is an off-axis value which is a constant.

* * * * *